(12) United States Patent
Hiroi et al.

(10) Patent No.: US 8,310,810 B2
(45) Date of Patent: Nov. 13, 2012

(54) ELECTRIC DOUBLE-LAYER CAPACITOR INCLUDING HOLES PENETRATING A NEGATIVE ELECTRODE CURRENT COLLECTOR AND METHOD OF PRODUCING SAME

(75) Inventors: Osamu Hiroi, Tokyo (JP); Daigo Takemura, Tokyo (JP); Kenro Mitsuda, Tokyo (JP); Shigeru Aihara, Tokyo (JP); Kazuki Kubo, Tokyo (JP); Yasushi Uehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 608 days.

(21) Appl. No.: 12/265,035

(22) Filed: Nov. 5, 2008

(65) Prior Publication Data

US 2009/0147442 A1    Jun. 11, 2009

(30) Foreign Application Priority Data

Dec. 6, 2007    (JP) .................................. 2007-315810

(51) Int. Cl.
*H01G 9/00*    (2006.01)

(52) U.S. Cl. ..................................... 361/502; 29/25.03

(58) Field of Classification Search .................. 361/502, 361/503
See application file for complete search history.

(56) References Cited

U.S. PATENT DOCUMENTS

| | | | | |
|---|---|---|---|---|
| 4,317,351 | A * | 3/1982 | Borrows | 72/186 |
| 5,849,430 | A * | 12/1998 | Lee | 429/94 |
| 6,096,455 | A * | 8/2000 | Satake et al. | 429/241 |
| 6,461,769 | B1 * | 10/2002 | Ando et al. | 429/231.95 |
| 7,191,502 | B1 * | 3/2007 | Ashizawa et al. | 29/2 |
| 2006/0115718 | A1 * | 6/2006 | Parsian et al. | 429/152 |
| 2007/0215926 | A1 * | 9/2007 | Mitsuda et al. | 257/298 |
| 2008/0089006 | A1 * | 4/2008 | Zhong et al. | 361/303 |

FOREIGN PATENT DOCUMENTS

| | | |
|---|---|---|
| JP | 10-326628 | 12/1998 |
| JP | 11007961 A * | 1/1999 |
| JP | 11312629 A * | 11/1999 |
| JP | 2001-236945 | 8/2001 |
| JP | 2003-123767 | 4/2003 |
| WO | WO 2004/097867 | 11/2004 |

* cited by examiner

*Primary Examiner* — David M Sinclair
(74) *Attorney, Agent, or Firm* — Oblon, Spivak, McClelland, Maier & Neustadt, L.L.P.

(57) ABSTRACT

The present invention relates to an electric double-layer capacitor and a method for producing same capable of evenly and rapidly doping a negative electrode layer with lithium ions. The electric double-layer capacitor comprises: a positive electrode including a positive electrode layer formed on one surface of a positive electrode current collector; a negative electrode including a negative electrode layer formed on one surface of a negative electrode current collector; a first separator disposed between the positive electrode layer and the negative electrode layer; and a second separator disposed between the positive electrode current collector and the negative electrode current collector, in which the negative electrode includes holes penetrating through the negative electrode current collector and reaching the negative electrode layer.

10 Claims, 4 Drawing Sheets

ELECTRIC DOUBLE-LAYER CAPACITOR INCLUDING HOLES PENETRATING A NEGATIVE ELECTRODE CURRENT COLLECTOR AND METHOD OF PRODUCING SAME

BACKGROUND OF THE INVENTION

1. Field of the Invention

The present invention relates to an electric double-layer capacitor and a method for producing the electric double-layer capacitor, and more particularly, to a lithium ion capacitor, and a method for producing the lithium ion capacitor.

2. Description of the Related Art

A general electric double-layer capacitor is an electric storage device including a sheet-like positive electrode and a sheet-like negative electrode each having an electrode layer containing a carbon material such as activated carbon and binders, a porous separator which separates both of these electrodes facing each other and electrically isolates these electrodes from each other, and an electrolyte impregnating the members. The electric storage device uses the electrostatic capacity of the electric double-layer, which is generated at the interface between the positive electrode or the negative electrode and the electrolyte. The electric double-layer capacitor has advantages in that the electric double-layer capacitor is capable of inputting and outputting a large current because no chemical reaction occurs at the time of charging and discharging, and that the lifetime is long because deterioration caused by charging and discharging is small.

Further, an energy quantity E which is stored in the electric double-layer capacitor has a relationship of $E=\frac{1}{2} CV^2$ between electrostatic capacity C and applied voltage V. For that reason, particularly, withstand voltage is improved to increase usable voltage, thereby making it possible to improve energy density.

In recent years, as a technology for dramatically improving the withstand voltage of electric double-layer capacitors, attention has been paid to lithium ion capacitors in which the carbon material (negative electrode layer) of a negative electrode is doped with lithium (lithium is occluded or inserted into the carbon material) to decrease the negative electrode potential, thereby making it possible to apply a higher voltage. Lithium ion capacitors are different in configuration from normal electric double-layer capacitors in that negative electrodes containing the carbon material which may be doped with lithium and a metal current collector such as copper which is difficult to alloy with lithium, and the electrolyte containing lithium ions therein are used.

One type of lithium ion capacitor is configured in such a manner that a metal lithium sheet as a lithium ion supply source is disposed on the exterior of an electrode laminate and is brought into contact with the negative electrode electrochemically, and the negative electrode is gradually doped with lithium that has been eluted from the metal lithium sheet (for example, refer to JP 2006-286919 A). In this lithium ion capacitor, the metal lithium sheet and the negative electrode are electrically connected to each other. For that reason, the elution of lithium ions and doping of the negative electrode (specifically, negative electrode layer) with the lithium ions are advanced with a potential difference between the metal lithium sheet and the negative electrode as a drive force. In this situation, because an ion conduction path is required to diffuse the eluted lithium ions over the entire electrode laminate, the entire electrode laminate must be made of a porous material. For that reason, a metal sheet that has been made porous in advance such as an expanded metal or a punched metal needs to be used as the electrode current collector instead of the nonporous metal sheet which is used in normal battery electrodes.

However, in the lithium ion capacitor disclosed in JP 2006-286919 A, the diffusion distance between the metal lithium which is a lithium ion supply source and the negative electrode layer which is in the vicinity of the center of the electrode laminate is long. This leads to the problem that it takes a long period of time to dope the negative electrode layer with lithium ions, and another problem that the negative electrode layer cannot be evenly doped with the lithium ions. These problems are caused by fact that the lithium ion supply source is disposed on an exterior of the electrode laminate, and holes in the electrode current collector (porous metal sheet) are completely blocked by the electrode layer, in the lithium ion capacitor of JP 2006-286919 A.

SUMMARY OF THE INVENTION

The present invention has been made to solve the above-mentioned problems, and therefore an object of the present invention is to provide an electric double-layer capacitor in which lithium ions may uniformly and rapidly be doped to a negative electrode layer and a method for producing the electric double-layer capacitor.

The present invention relates to an electric double-layer capacitor comprising: a positive electrode including a positive electrode layer formed on one surface of a positive electrode current collector; a negative electrode including a negative electrode layer formed on one surface of a negative electrode current collector; a first separator disposed between the positive electrode layer and the negative electrode layer; and a second separator disposed between the positive electrode current collector and the negative electrode current collector, wherein the negative electrode includes holes penetrating through the negative electrode current collector and reaching the negative electrode layer.

Further, the present invention relates to a method for producing an electric double-layer capacitor comprising: a positive electrode including a positive electrode layer formed on one surface of a positive electrode current collector; a negative electrode including a negative electrode layer formed on one surface of a negative electrode current collector; a first separator disposed between the positive electrode layer and the negative electrode layer; and a second separator disposed between the positive electrode current collector and the negative electrode current collector, wherein the method comprises forming the negative electrode layer on the one surface of the negative electrode current collector, and punching it from the negative electrode collecting side to form holes penetrating through the negative electrode current collector and reaching the negative electrode layer in the negative electrode.

The present invention is arrived at providing an electric double-layer capacitor in which lithium ions may uniformly and rapidly be doped to a negative electrode layer and a method for producing the electric double-layer capacitor.

DETAILED DESCRIPTION OF THE PREFERRED EMBODIMENTS

First Embodiment

Figure 1:
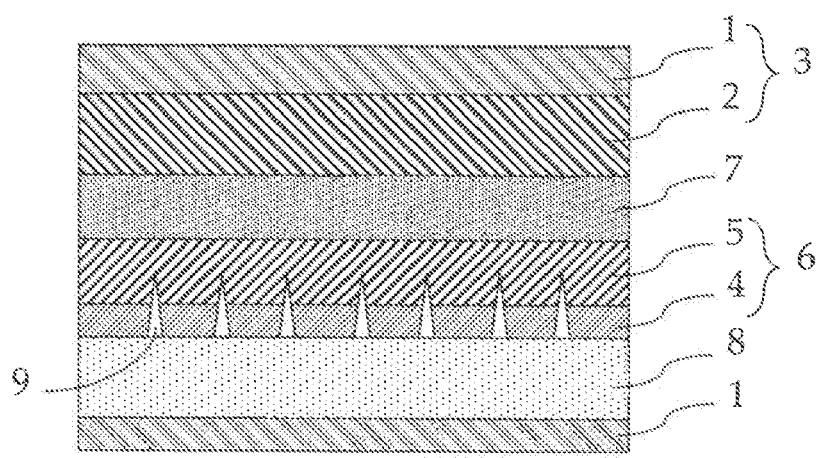
FIG. 1 is a cross-sectional view illustrating an electric double-layer capacitor according to a first embodiment.

FIG. 1 is a cross-sectional view illustrating an electric double-layer capacitor according to a first embodiment. Referring to FIG. 1, the electric double-layer capacitor comprises a positive electrode 3 having a positive electrode layer 2 formed on one surface of a positive electrode current collector 1, a negative electrode 6 having a negative electrode layer 5 formed on one surface of a negative electrode current collector 4, a first separator 7 which is disposed between the positive electrode layer 2 and the negative electrode layer 5, and a second separator 8 which is disposed between another positive electrode current collector 1 and the negative electrode current collector 4. The negative electrode 6 is formed with holes 9 that penetrate through the negative electrode current collector 4 and reach the negative electrode layer 5.

FIG. 1 illustrates only one basic configuration unit of the electric double-layer capacitor, but a plurality of basic configuration units can be laminated so as to obtain a required charged and discharged capacity as an entire cell.

The negative electrode current collector 4 that constitutes the negative electrode 6 is not particularly restricted, but a negative electrode current collector 4 which is used for a normal electric double-layer capacitor can be used. For example, the negative electrode current collector 4 can be formed of a metal sheet such as copper, nickel, or copper that has been nickel-plated.

However, when a metal sheet that has been made porous in advance such as an expanded metal or a punched metal is used as the negative electrode current collector 4 as described in JP 2006-286919 A, there arise the following problems.

(1) A porous metal sheet is remarkably small in conductive portion cross section as compared with a nonporous metal sheet. For that reason, when a porous metal sheet is used for the negative electrode current collector 4, the electric resistance of the negative electrode current collector 4 becomes large, thereby making it difficult to obtain the charge/discharge characteristics of a large current.

(2) It is difficult to form the negative electrode layer 5 on a porous metal sheet because the holes exist. For example, when the negative electrode layer 5 is formed on a porous metal sheet by coating, a smooth negative electrode layer 5 cannot be obtained by one coating process. For that reason, after the hole portions have been filled in a first coating process, the smooth negative electrode layer 5 must be formed in a given thickness in second and subsequent coating processes. This causes a deterioration in conforming article ratio and an increase in costs with an increase in the number of producing processes.

(3) A porous metal sheet is expensive compared to a nonporous metal sheet.

Accordingly, it is preferred that the negative electrode current collector 4 is not made porous, that is, it is made nonporous. The use of the nonporous metal sheet makes it possible to improve the current collecting performance to provide the charge/discharge characteristics of the large current, and to obtain the electric double-layer capacitor that can be produced readily and inexpensively.

The proper thickness of the negative electrode current collector 4 depends on the kind of material used, and the characteristics required for the produced electric double-layer capacitor, but is generally set to 5 to 50 μm. For example, when a large charge/discharge current is required, a relatively thick negative electrode current collector 4 is used in order to reduce the internal resistance. On the other hand, when a small charge/discharge current is required, a negative electrode current collector 4 which is as thin as possible is used in order to improve the energy density.

The material of the negative electrode layer 5 that constitutes the negative electrode 6 is not particularly restricted as long as lithium ions can be removed from or inserted into the material by the electrochemical reaction. For example, the negative electrode layer 5 can be made of a negative material which is used for the negative electrode of a lithium ion battery, such as black lead, amorphous carbon, tin, or silicon alloy. Further, the proper thickness of the negative electrode layer 5 depends on the kind of material used, but is generally set to 20 to 100 μm.

The method of forming the negative electrode layer 5 on the negative electrode current collector 4 is not particularly restricted, but there can be used known methods such as a rolling method, a coating method, or a molding method. In particular, when the nonporous negative electrode current collector 4 is used, the negative electrode layer 5 can be formed by one coating process, and the uniformity of the thickness of the negative electrode layer 5 is also improved. As a result, it is possible to improve the producing efficiency of the electric double-layer capacitor.

In this embodiment, in order to bind the negative electrode layer 5 to the negative electrode current collector 4, a binder can be blended into the material which the lithium ions can be removed from or inserted into. As the binder, there can be applied a fluorine resin such as polyvinylidene-fluoride (PVDF), styrene butadiene rubber (SBR), or acryl synthetic rubber. The blending quantity of the binder can be appropriately adjusted according to the material to be used.

Further, because the negative electrode layer 5 that has been formed on the negative electrode current collector 4 through the above-mentioned method is high in hole ratio and too low in density, a smooth roll (calender roll) press is conducted as the occasion demands to densify the negative electrode layer 5, thereby making it possible to reduce the electric resistance.

The holes 9 that penetrate through the negative electrode current collector 4 and reach the negative electrode layer 5 are defined in the negative electrode 6 as a diffusion path of the electrolyte containing the lithium ions therein. As a result, the electrolyte containing the lithium ions therein is rapidly impregnated with the negative electrode layer 5, and the negative electrode layer 5 can be evenly and rapidly doped with the lithium ions.

The holes 9 can be defined by forming the negative electrode layer 5 on one surface of the negative electrode current collector 4, and then punching it from the negative electrode current collector 4 side. When the punching is conducted from the negative electrode current collector 4 side, no damage such as defects, breaking, or cracks occurs in the negative electrode layer 5.

Figure 2:
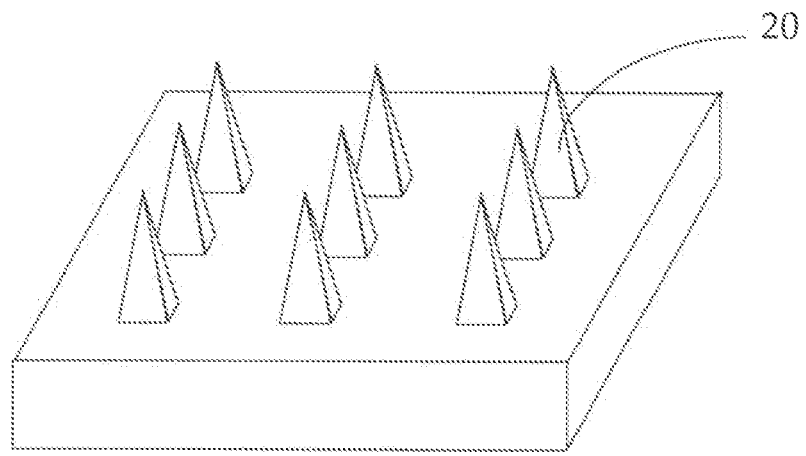
FIG. 2 is a perspective view illustrating a flat die which can be used to produce a negative electrode with holes.

The punching can be conducted, for example, by a mechanical process such as pressing using a punching die with projections corresponding to the shape of the holes 9. Specifically, the mechanical process can be conducted by pressing the negative electrode 6 which is sandwiched between a flat die having projections 20 illustrated in FIG. 2 and a flat press.

Figure 3:
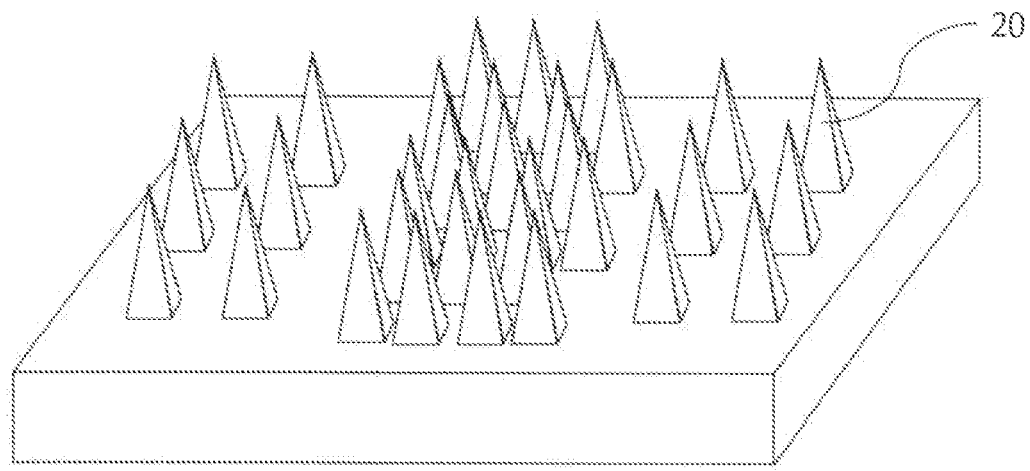
FIG. 3 is a perspective view illustrating another flat die which can be used to produce the negative electrode with holes.

In the electric double-layer capacitor, when a lithium ion supply source is disposed on the exterior of the electrode laminate as will be described in detail below, the distance from the lithium ion supply source may vary depending on the in-plane position of the negative electrode layer 5. In such an arrangement, the doping of lithium ions is intensively conducted at the periphery of the negative electrode layer 5 because the distance from the lithium ion supply source is short. In addition, the doping of lithium ions is difficult to conduct in the center of the negative electrode layer 5 because the distance from the lithium ion supply source is long. As a result, the in-plane distribution of the doped quantity of the lithium ions in the negative electrode layer 5 becomes uneven. Accordingly, it is preferred that the holes 9 are densely formed in the center of the negative electrode 6, and are sparsely formed in the periphery of the negative electrode 6. Specifically, the number of holes 9 in the center of the negative electrode 6 can be larger than the number of holes 9 in the periphery of the negative electrode 6. In order to form the above-mentioned holes 9 in the negative electrode 6, there can be used a flat die having more projections 20 in the center than in the periphery, as illustrated in FIG. 3. Alternatively, the size of the holes 9 in the center of the negative electrode 6 can be larger than the size of the holes 9 in the periphery of the negative electrode 6. In order to form the above-mentioned holes 9 in the negative electrode 6, there can be used a flat die having the size of the projections 20 larger in the center and smaller in the periphery.

Figure 4:
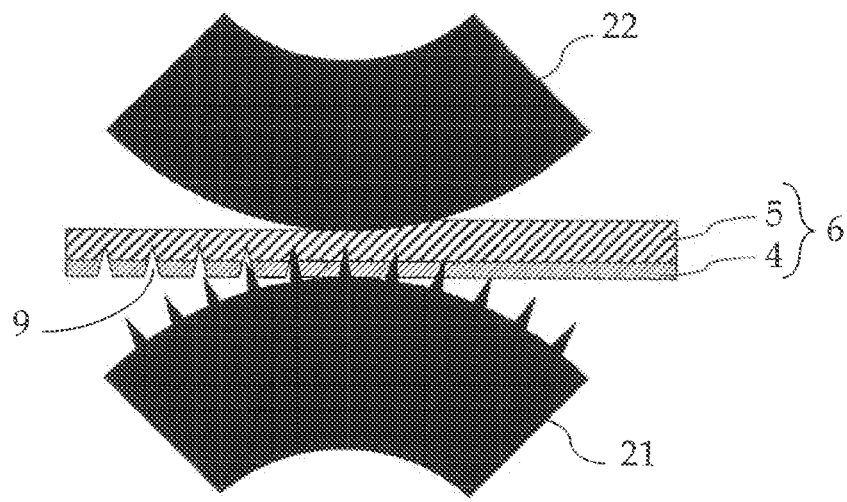
FIG. 4 is a diagram for explaining a process of producing the negative electrode with holes by roll press.

Further, as illustrated in FIG. 4, when the negative electrode 6 is sandwiched between a projection roll 21 having projections on a surface thereof and a smooth roll 22 having no projections on a surface thereof, and is then roll-pressed, the holes 9 can be continuously formed even when the area of the negative electrode 6 is large. In this embodiment, because the diameter and depth of the holes 9 depend on the punching depth of the projections, it is necessary to adjust the gap of the die at the time of pressing, or to design the projections according to the diameter and depth of the holes 9 in advance. In particular, when the projections are designed according to the diameter and depth of the holes 9 in advance, the compression (densification) of the negative electrode layer 5 can be conducted together with the punching. As a result, production efficiency is further improved. In that case, the height of the projections of the projection roll 21 must be lower than the thickness of the negative electrode 6.

The holes 9 are preferably formed in such a manner that the area of the entire holes on the surface of the negative electrode current collector 4 on the second separator 8 side is 1% to 30% of the entire area of the surface of the negative electrode current collector 4. In particular, when the hole area is 3% to 15%, the negative electrode current collector 4 can be embedded into the negative electrode layer 5 without impairing the negative electrode reaction to enhance the current collecting effect, and also the diffusion path of the electrolyte containing the lithium ions therein can be sufficiently ensured. When the hole area is lower than 1%, the holes 9 are too small in number, and the supply of the electrolyte to the negative electrode layer 5 and the doping of the lithium ions may be insufficient. On the other hand, when the hole area exceeds 30%, defects in the negative electrode layer 5 increase, and the negative electrode reaction may be impaired.

The shape of the holes 9 is not particularly restricted, but is preferably a square pyramid taking the facility of producing the holing die into consideration.

The diameter of the holes 9 on the surface of the negative electrode current collector 4 on the second separator 8 side is preferably set to be equal to or smaller than 300 μm, and more preferably set to be equal to or smaller than 100 μm though the larger diameter is advantageous from the viewpoint of the diffusion of the electrolyte containing the lithium ions therein. When the diameter of the holes 9 falls within the above-mentioned range, it is possible to prevent an increase in resistance and a deterioration in strength due to a reduction in conductive cross section of the negative electrode current collector 4. In this embodiment, diameter of the holes 9 means the diameter when the holes 9 on the surface of the negative electrode current collector 4 are circular, and means a long side when the holes 9 on the surface of the negative electrode current collector 4 are rectangular.

The depth of the holes 9 is not particularly restricted as long as the holes 9 penetrate through the negative electrode current collector 4 and reach the negative electrode layer 5. However, when the holes 9 that penetrate through both the negative electrode current collector 4 and the negative electrode layer 5 are formed through the above-mentioned punching, the peripheral portions of the holes 9 on the surface of the negative electrode layer 5 on the first separator 7 side become embossed. As a result, when the electric double-layer capacitor is fabricated, there may be a risk that a contact failure occurs with respect to the first separator 7. For that reason, it is preferred that the holes 9 do not penetrate through the negative electrode layer 5. Similarly, in this case, when the emboss of the peripheral portions of the holes 9 on the surface of the negative electrode layer 5 can be removed by mechanical means, the above-mentioned problem does not arise.

The larger number of holes 9 is advantageous from the viewpoint of ion diffusion. However, taking an increase in resistance and deterioration in strength due to a reduction in conductive cross section of the negative electrode current collector 4, and breaking in the negative electrode layer 5 into consideration, it is preferred that the number of holes 9 be equal to or larger than 50 and lower than 1000 per 1 $cm^2$ with respect to the negative electrode current collector 4.

The positive electrode current collector 1 that constitutes the positive electrode 3 is not particularly restricted, but the positive electrode current collector which is used for the normal electric double-layer capacitor can be used. For example, the positive electrode current collector 1 can be made of aluminum.

When a metal sheet that has been made porous in advance such as an expanded metal or a punched metal is used as the positive electrode current collector 1 as disclosed in JP 2006-286919 A, there arise the above-mentioned problems (1) to (3). Accordingly, it is preferred that the positive electrode current collector 1 is not made porous, that is, is made nonporous. When a nonporous positive electrode current collector 1 is used, it is possible to improve the current collecting performance to provide the charge/discharge characteristics of the large current, and to obtain a electric double-layer capacitor that can be produced readily and inexpensively.

Further, the thickness of the positive electrode current collector 1 is generally set to be 20 to 400 μm though the appropriate thickness depends on the kind of materials used.

The positive electrode layer 2 that constitutes the positive electrode 3 is not particularly restricted, but a positive electrode layer which is used for a normal electric double-layer capacitor can be used. For example, the positive electrode layer 2 can be made of a carbon material which is large in surface area and enables the electrostatic capacity to be improved. The carbon material can be particulate activated carbon of about 10 μm in diameter. There can be also used steam activated carbon, alkali activated carbon, and nanogate carbon. Further, the thickness of the positive electrode layer 2 is generally set to be 50 to 150 μm though the appropriate thickness depends on the kind of materials used.

The method of forming the positive electrode layer 2 on the positive electrode current collector 1 is not particularly restricted, but there can be used known methods such as a rolling method, a coating method, or a molding method.

In this embodiment, in order to bind the positive electrode layer 2 to the positive electrode current collector 1, a binder can be blended into the carbon material. As the binder, there can be applied a fluorine resin such as polytetrafluoroethylene (PTFE), styrene butadiene rubber (SBR), or acryl synthetic rubber. The blending quantity of the binder can be appropriately adjusted according to the material to be used.

Further, because the positive electrode layer 2 that has been formed on the positive electrode current collector 1 through the above-mentioned method may be high in hole ratio and too low in density, a smooth roll (calender roll) press is conducted as the occasion demands to densify the positive electrode layer 2, thereby making it possible to reduce the electric resistance.

A separator is interposed between the positive electrode 3 and the negative electrode 6 in order to electrically isolate both of these electrodes from each other, and hold the electrolyte so as to ensure ion migration between the electrodes. In this embodiment, the first separator 7 is disposed between the positive electrode layer 2 and the negative electrode layer 5, and the second separator 8 is disposed between the positive electrode current collector 1 and the negative electrode current collector 4.

The first separator 7 and the second separator 8 are not particularly restricted, but a porous separator which is used in lithium ion batteries or electric double-layer capacitors can be used. In particular, a separator having a porous structure that communicates in a creeping direction is preferred from the viewpoint of ion diffusion. The first separator 7 and the second separator 8 may be formed of a cellulosic paper separator. Alternatively, a porous polyolefin film or a glass fiber sheet can be used. Those materials are excellent in electrical insulation properties and retention properties of the electrolyte, high in lunge strength with respect to the roughness of those surfaces of the electrodes, and electrochemically stable in contact state with those electrodes.

The first separator 7 and the second separator 8 can be identical with or different from each other. However, it is preferred that the mean pore diameter of the second separator 8 is larger than the mean pore diameter of the first separator 7. With the above-mentioned configuration, since the migration rate of the electrolyte in the in-plane direction of the second separator 8 becomes large, the electrolyte containing the lithium ions therein can be rapidly supplied to the negative electrode layer 5 through the holes 9.

The thicknesses of the first separator 7 and the second separator 8 are not particularly restricted because the thicknesses can be appropriately set according to the size of the fabricated electric double-layer capacitor. The thicknesses of those first and second separators 7 and 8 are generally set to be 20 to 50 μm.

In the electric double-layer capacitor according to this embodiment, there is disposed a lithium ion supply source in order to dope the negative electrode layer 5 with the lithium ions. In this embodiment, the lithium ion supply source is not particularly restricted. Not only metal lithium but also a lithium compound which is used as the positive electrode material of the lithium ion battery can be used. The lithium compound can be, for example, a lithium compound such as lithium cobaltate, lithium manganate, lithium nickelate, or lithium olivine iron.

In the electric double-layer capacitor according to this embodiment, because the holes 9 are formed, even when the lithium ion supply source is disposed on the exterior of the electrode laminate, the negative electrode layer 5 can be evenly and rapidly doped with the lithium ions.

Figure 5:
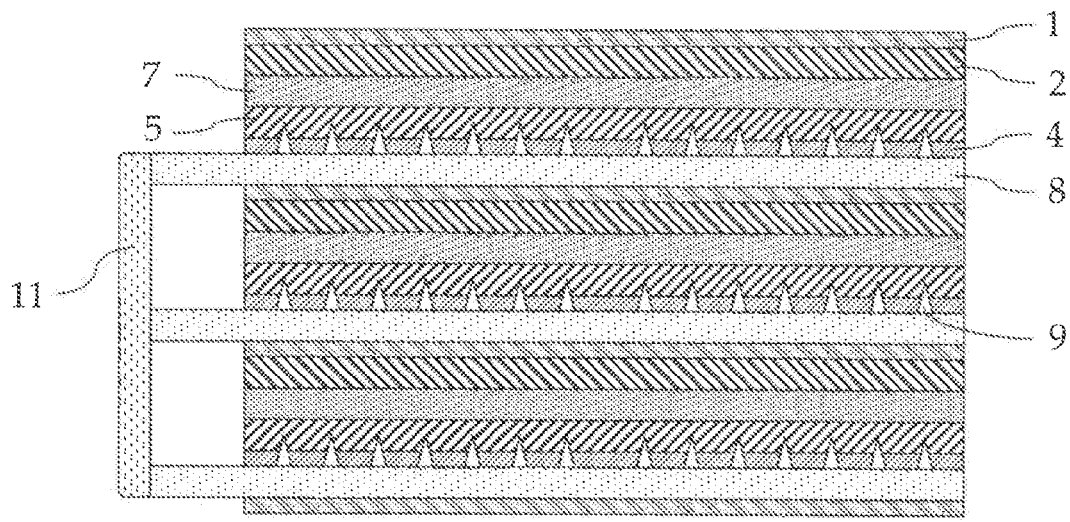
FIG. 5 is a cross-sectional view illustrating the electric double-layer capacitor when a lithium ion supply source is disposed on an exterior of an electrode laminate.

When the lithium ion supply source is disposed on the exterior of the electrode laminate, for example, as illustrated in FIG. 5, the end of the second separator 8 extends to the exterior of the electrode laminate, and a metal lithium 11 can be brought into contact with the second separator 8 that extends to the exterior. Because the metal lithium 11 is electrically connected to the negative electrode current collector 4, lithium ions are eluted to the second separator 8 due to the electrochemical reaction, and the negative electrode layer 5 is doped with the lithium ions through the holes 9. In the above-mentioned configuration, when a separator which has 70% or more porosity and has the holes communicating in the in-plane direction is used as the second separator 8, the diffusion of the lithium ions can be promoted.

On the other hand, in the electric double-layer capacitor according to this embodiment, the lithium ion supply source can be disposed inside the electrode laminate. As a result, when lithium ions are insufficient in the negative electrode layer 5, the lithium ion supply source functions as a reservoir that rapidly dopes the negative electrode layer 5 with lithium ions, and can keep the constant lithium ion concentration of the negative electrode layer 5. Further, because the diffusion distance from the lithium ion supply source to the negative electrode layer 5 is short, the negative electrode layer 5 can be further evenly and rapidly doped with lithium ions.

Figure 6:
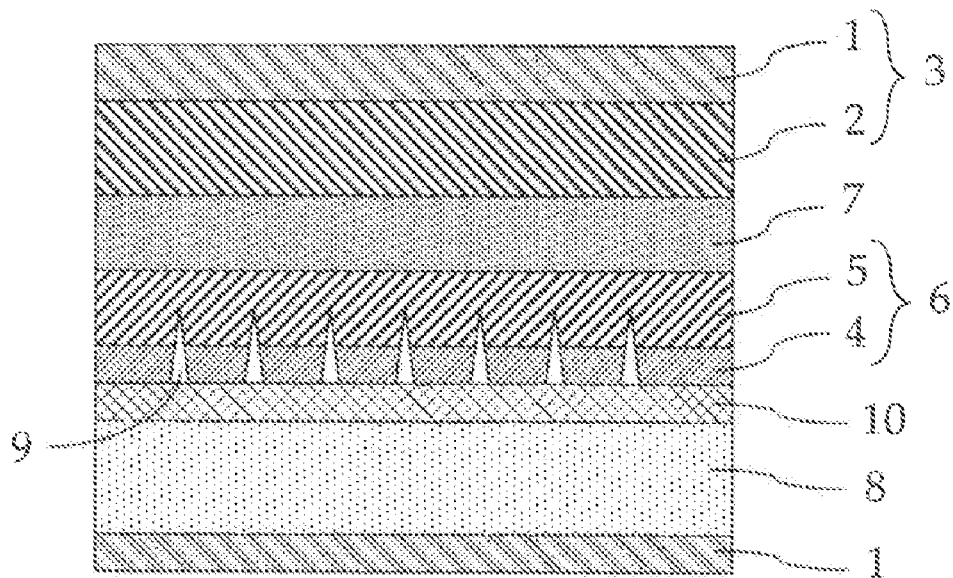
FIG. 6 is a cross-sectional view illustrating the electric double-layer capacitor when the lithium ion supply source is disposed inside an electrode laminate.

Specifically, when metal lithium is used as the lithium ion supply source, a lithium ion doped layer 10 containing metal lithium is disposed between the negative electrode current collector 4 and the second separator 8, as illustrated in FIG. 6. In the electric double-layer capacitor having the above-mentioned configuration, an aging process is conducted to dope the negative electrode layer 5 with lithium ions. In this embodiment, the conditions of the aging process are not particularly restricted, but can be appropriately set according to the size of the fabricated electric double-layer capacitor.

Figure 7:
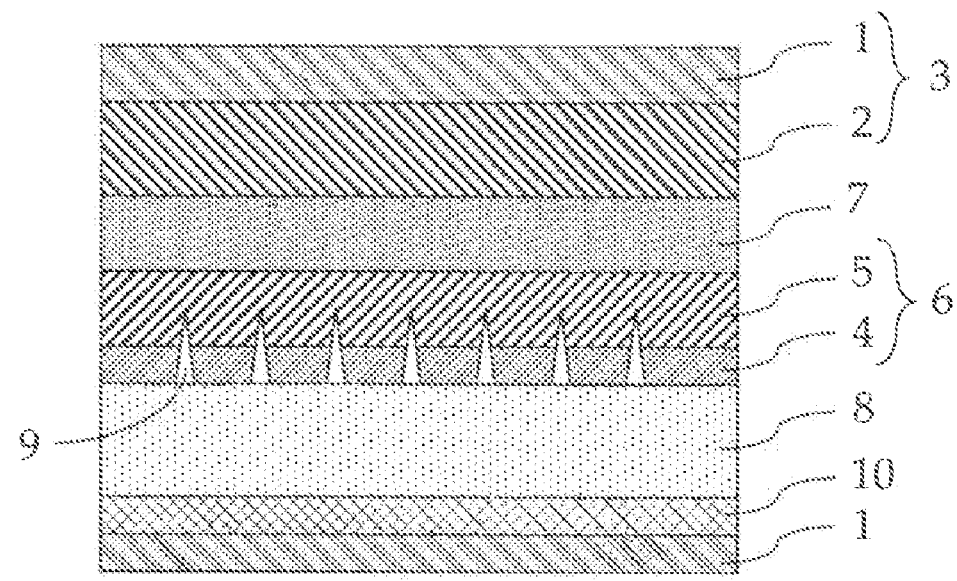
FIG. 7 is a cross-sectional view illustrating the electric double-layer capacitor when the lithium ion supply source is disposed inside an electrode laminate.

Further, when a lithium compound is used as the lithium ion supply source, the lithium ion doped layer 10 containing a lithium compound is disposed between the positive electrode current collector 1 and the second separator 8, as illustrated in FIG. 7. In the electric double-layer capacitor having the above-mentioned configuration, the charging and discharging operation is repeated in an initial stage to dope the negative electrode layer 5 with lithium ions. In this embodiment, the conditions of the charging and discharging operation are not particularly restricted, but can be appropriately set according to the size of the fabricated electric double-layer capacitor, or the voltage at the time of charging or discharging. However, it is preferred that the doping operation is conducted with a lower current from the viewpoint of more uniform doping of the negative electrode layer 5 with lithium ions.

The method of forming the lithium ion doped layer 10 is not particularly restricted, but there can be used known methods such as a rolling method, a coating method, or a molding method. Alternatively, a sheet which is produced separately can be used.

In this embodiment, in order to bind the lithium ion doped layer 10 to the positive electrode current collector 1 or the negative electrode current collector 4, a binder can be blended into the lithium ion supply source. As the binder, there can be applied a fluorine resin such as polyvinylidene-fluoride (PVDF), styrene butadiene rubber (SBR), or acryl synthetic rubber. Further, an electric conduction auxiliary agent such as acetylene black can be blended in order to improve the conductivity.

The shape of the lithium ion doped layer 10 can be formed into not only a foil geometry but also various shapes such as a ribbon or wire shape.

The electrolyte is injected into the electric double-layer capacitor according to this embodiment. The electrolyte is not particularly restricted, but electrolyte that has been dissolved in a solvent, or an ionic liquid can be used. The combination of a cation source with an anion source can be used as the electrolyte. In this embodiment, salt containing lithium can be used as the cation source. Further, salt containing $BF_4^-$, $PF_6^-$, $ClO_4^-$, $CF_3SO_3^-$, $N(SO_2Rf_2\text{-})$, or $C(SO_2Rf)_3^-$ (where $Rf=CF_3$ or $C_2F_5$) can be used as the anion source. Those components can be used independently or in combination. As the solvent, there can be applied ethylene carbonate, dimethyl carbonate, diethyl carbonate, propylene carbonate, ethyl methyl carbonate, dimethoxymethane, diethoxyethane, γ-butyl lactone, acetonitrile, or propionytolyl, and those components can be used independently or in combination.

The electric double-layer capacitor according to this embodiment is generally housed in a vessel in use. The vessel is not particularly restricted. For example, there can be used a vessel which is made of, for example, an aluminum laminate film, plastic, or various metals. Further, the shape of the vessel is not particularly restricted, either, and can be appropriately selected according to the intended purpose among, for example, a cylindrical type or a square type. Further, the positive terminal and the negative terminal are connected to the respective electrodes, thereby making it possible to conduct electric interchange between the exterior and the interior of the vessel.

EXAMPLES

Hereinafter, the present invention will be described in more detail with reference to examples, but the present invention is not limited by those examples.

Example 1

Fabrication of Positive Electrode

An electrode paste was prepared by mixing 5 parts by weight of acetylene black with 85 parts by weight of activated carbon and 10 parts by weight of acrylic polymer together with water. The electrode paste was coated on one surface of an aluminum foil (300 mm×300 mm×50 μm), and then dried at 120° C. for 60 minutes, to thereby obtain a positive electrode. Then, the positive electrode was pressurized by a calender roll press to densify the positive electrode layer.

(Fabrication of Negative Electrode)

An electro paste was prepared by mixing N-methylpyrrolidone with 91 parts by weight of black lead and 9 parts by weight of polyvinylidene-fluoride. The electrode paste was coated on one surface of a copper foil (300 mm×300 mm×20 μm), and then dried at 120° C. for 60 minutes, to thereby obtain a negative electrode having a thickness of about 80 μm. Then, the negative electrode was pressurized by a calender roll press to densify the negative electrode layer, and thereafter pressed by using a punching die, to thereby define holes that penetrate through the negative electrode current collector and reach the negative electrode layer in the negative electrode. In this example, the punching die obtained by forming square pyramid projections on the surface of the metal plate through a mechanical process was used. The square pyramid projections were of a square which was about 0.5 mm high from the bottom surface to the top, and 0.2 mm in one side of the bottom surface. Further, the arrangement of the square pyramid projections was of a square lattice which was 0.6 mm on one side (refer to FIG. 2). The holes that are defined by using the punching die was arranged in square lattice at intervals of 1.2 mm on the surface of the negative electrode current collector, and have a square shape which was 100 μm on one side. Further, the area of all the holes on the surface of the negative electrode current collector was 3% of the entire area of the surface of the negative electrode current collector.

(Fabrication of Electric Double-Layer Capacitor)

A cellulosic paper separator (40 mm×40 mm×40 μm) was used as the first separator and the second separator, and a metal lithium foil (13 mm×13 mm×30 μm) was used as the lithium ion supply source. The separator, the metal lithium foil, the positive electrode, and the negative electrode were laminated on each other as illustrated in FIG. 6, and thereafter the laminate was inserted into a vessel formed of an aluminum laminate film. Then, a mixture solvent of ethylene carbonate and diethyl carbonate containing 1.5 mol/l of $LiPF_6$ (the weight ratio of ethylene carbonate and diethyl carbonate was 3:7) was injected into the vessel, and sealed, to thereby obtain an electric double-layer capacitor. The electric double-layer capacitor was left within a thermostatic bath of 50° C. for seven days, and an aging process was conducted to promote the doping of the negative electrode layer with lithium ions.

Example 2

In the second example, the size of the holes that are defined in the negative electrode was made larger than that in Example 1 to fabricate an electric double-layer capacitor. Specifically, the electric double-layer capacitor was fabricated in the same manner as that of Example 1 except that the size of the projections of the punching die was changed to conduct the punching, and the holes each having a square shape which is 150 μm on one side were formed on the surface of the negative electrode current collector. The area of all the holes on the surface of the negative electrode current collector was about 6% of the entire area of the surface of the negative electrode current collector.

Example 3

The electric double-layer capacitor was fabricated in the same manner as that of Example 1 except that a lithium ion doped layer consisting of 85% by weight of lithium cobaltate, 5% by weight of acetylene black, and 10% by weight of polyvinylidene-fluoride was arranged at a given position illustrated in FIG. 7 instead of the metal lithium foil. In the electric double-layer capacitor, the aging process conducted in Example 1 was not executed, and the charging and discharging operation was repeated three times at a voltage between the lower limit voltage of 2V and the upper limit voltage of 4.2V in an initial stage, to thereby dope the negative electrode layer with the lithium ions.

Comparative Example 1

In Comparative Example 1, an electric double-layer capacitor was fabricated by using an expanded metal as the negative electrode current collector.

Specifically, the electrode paste of Example 1 was coated on the expanded metal of copper having a thickness of 50 μm, and then dried, to embed the hole portions of the expanded metal. Then, the electrode paste of Example 1 is once again coated on the expanded metal, and then dried, to thereby form the negative electrode layer. The electric double-layer capacitor was fabricated in the same manner as that in Example 1 by using the negative electrode thus obtained.

Comparative Example 2

In Comparative Example 2, an electric double-layer capacitor was fabricated by using a punched metal as the negative electrode current collector.

Specifically, the electrode paste of Example 1 was coated on the punched metal of copper having a thickness of 20 μm, and then dried, to embed the hole portions of the punched metal. Then, the electrode paste of Example 1 was once again coated on the punched metal, and then dried, to thereby form the negative electrode layer. The electric double-layer capacitor was fabricated in the same manner as that in Example 1 by using the negative electrode thus obtained.

Comparative Example 3

In Comparative Example 3, an electric double-layer capacitor was fabricated by using an expanded metal as the positive electrode current collector and the negative electrode current collector.

Specifically, the electrode paste of Example 1 was coated on the aluminum expanded metal having a thickness of 70 μm, and then dried, to embed the hole portions of the aluminum expanded metal. Then, the electrode paste of Example 1 was once again coated on the aluminum expanded metal, and then dried, to thereby form the positive electrode layer. Similarly, the electrode paste of Example 1 was coated on the punched metal of copper having a thickness of 50 μm, and then dried, to thereby embed the hole portions of the punched metal. Then, the electrode paste of Example 1 was once again coated on the punched metal, and then dried, to thereby form the negative electrode layer. The electric double-layer capacitor was fabricated in the same manner as that in Example 1 by using the positive electrode and negative electrode thus obtained, and the metal lithium foil (10 mm×10 mm×60 μm).

In the electric double-layer capacitors which have been obtained in Examples 1-3 and Comparative Examples 1-3, the electrostatic capacitance was evaluated when the charging and discharging operation was conducted at a voltage between the lower limit voltage of 2V and the upper limit voltage of 3.6V under the environment of 25° C., and the discharge current was changed between 15 mA and 120 mA. The results are illustrated in Table 1.

TABLE 1

|  | Electrostatic Capacitance (F) | | |
| --- | --- | --- | --- |
|  | 15 mA | 60 mA | 120 mA |
| Example 1 | 40.2 | 32.9 | 28.6 |
| Example 2 | 40.1 | 32.0 | 27.3 |
| Example 3 | 50.6 | 33.2 | 27.8 |
| Comparative Example 1 | 39.7 | 30.1 | 24.6 |
| Comparative Example 2 | 38.6 | 28.3 | 22.3 |
| Comparative Example 3 | 38.0 | 26.9 | 20.0 |

As illustrated in Table 1, all of the electric double-layer capacitors according to Examples 1-3 were higher in electrostatic capacitance than the electric double-layer capacitors of Comparative Examples 1-3. In particular, when the discharge current was large, the difference from the Comparative Examples was large. Further, the electric double-layer capacitor according to Example 3 was remarkably high in electrostatic capacitance as compared with the other electric double-layer capacitors when the discharge current was low.

Example 4

In Example 4, it was studied whether or not the densification of the negative electrode layer and the punching of the negative electrode can be executed at the same time.

In the same manner as that of Example 1, the negative electrode layer of 80 μm was formed on one surface of a copper foil (300 mm×300 mm×20 μm) to fabricate the negative electrode. Then, as illustrated in FIG. 4, the negative electrode 6 was sandwiched between the projection roll 21 and the smooth roll 22, and then roll-pressed. As a result, the densification of the negative electrode layer 5 and the punching of the negative electrode could be executed at the same time. The diameter of the respective rolls used in this Example was 300 mm. Further, the square pyramid projection of the projection roll 21 was a square which was about 60 μm high from the bottom surface to the top, and 40 μm on one side of the bottom surface. Further, the arrangement of the square pyramid projections was of a square lattice which was 1.2 mm on one side. The holes 9 that were defined by using the projection roll 21 were arranged in a square lattice at intervals of 1.2 mm on the surface of the negative electrode current collector 4, and have a square shape which was 40 μm on one side. Further, the thickness of the negative electrode layer 5 was 70 μm.

Example 5

Figure 8:
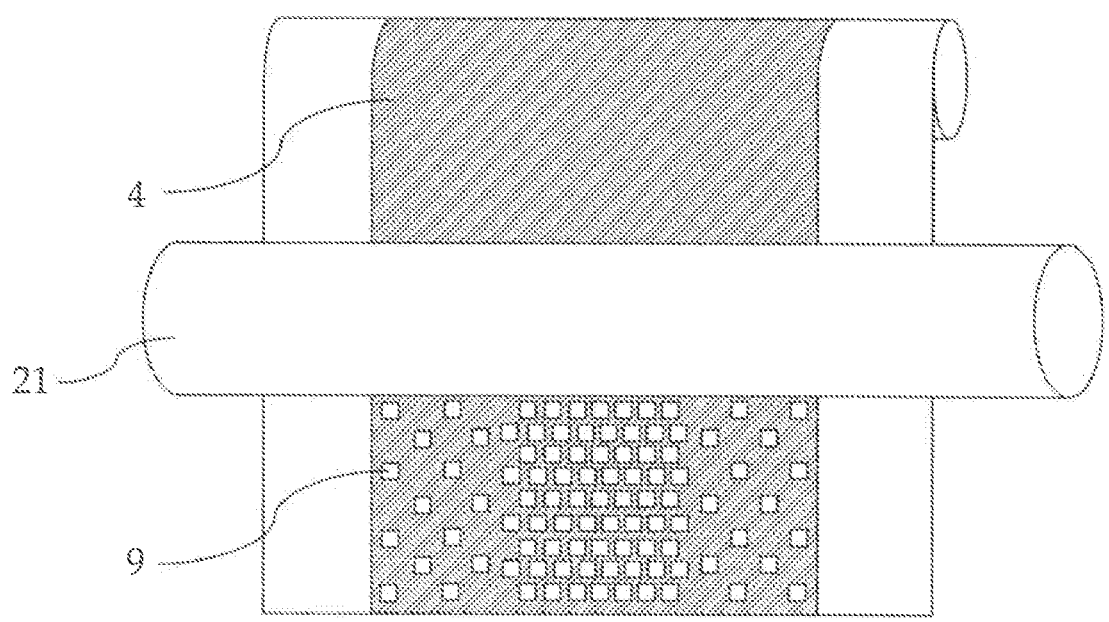
FIG. 8 is a diagram for explaining a process of producing a negative electrode with holes by roll press according to Example 5.

In Example 5, the electric double-layer capacitor was fabricated in the same manner as that of Example 1 except that the roll press (densification of negative electrode layer 5 and punching of negative electrode) was executed by using the projection roll 21 in which the projections 20 were densely formed in the center of the projection roll 21, and were sparsely formed in the periphery thereof, as illustrated in FIG. 8. In FIG. 8, the projections 20 of the projection roll 21 were not illustrated. In this Example, the number of projections 20 of the projection roll 21 was set to 500 per 1 cm$^2$ in the center, and set to 50 per 1 cm$^2$ in the periphery.

Example 6

In Example 6, the electric double-layer capacitor was fabricated in the same manner as that of Example 1 except that the roll press was conducted by using a projection roll having projections evenly formed at regular intervals. In this Example, the number of projections of the projection roll was set to 200 per 1 cm$^2$.

In the electric double-layer capacitors according to Examples 5 and 6, the electromotive forces in the center and the periphery of the negative electrode with respect to the lithium reference electrode were measured, to thereby evaluate the in-plane distribution of the doped quantity of lithium ions in the negative electrode layer. As a result, in the electric double-layer capacitor according to Example 6, a difference in electromotive force between the center and periphery of the negative electrode was 0.5 V. On the other hand, in the electric double-layer capacitor according to Example 5, the difference in electromotive force between the center and periphery of the negative electrode was 0.2 V. Accordingly, it was found that with the holes densely formed in the center of the negative electrode, and sparsely formed in the periphery of the negative electrode that the in-plane distribution of the doped quantity of the lithium ions in the negative electrode layer becomes even.

What is claimed is:

1. An electric double-layer capacitor comprising:
   a positive electrode including a positive electrode layer formed on one surface of a first positive electrode current collector;
   a negative electrode including a negative electrode layer formed on one surface of a negative electrode current collector;
   a first separator disposed between the positive electrode layer and the negative electrode layer;
   a second separator disposed between a second positive electrode current collector and the negative electrode current collector; and
   a lithium ion doped layer disposed between the second separator and one of the negative electrode current collector and the second positive electrode current collector, wherein
   the negative electrode includes holes penetrating through the negative electrode current collector and reaching the negative electrode layer,
   an electrode layer is not formed between the second positive electrode current collector and the negative electrode current collector,
   the positive electrode, the negative electrode, the first separator, the second separator, and the lithium ion doped layer comprise a basic configuration unit, and
   the electric double-layer capacitor comprises plural basic configuration units.

2. The electric double-layer capacitor according to claim 1, wherein the first and second positive electrode current collectors and the negative electrode current collector are nonporous.

3. The electric double-layer capacitor according to claim 1, wherein a mean pore diameter of the second separator is larger than a mean pore diameter of the first separator.

4. The electric double-layer capacitor according to claim 1, wherein the holes that penetrate through the negative electrode current collector and reach the negative electrode layer are densely formed in the center of the negative electrode, and are sparsely formed in the periphery of the negative electrode.

5. The electric double-layer capacitor according to claim 1, wherein an area of all the holes in the negative electrode current collector surface on the second separator side is 1% to 30% of the entire area of the negative electrode current collector surface.

6. The electric double-layer capacitor according to claim 1, wherein hole distribution per 1 cm$^2$ of the negative electrode current collector is larger than 50 holes and lower than 1000 holes.

7. The electric double-layer capacitor according to claim 1, wherein a diameter of holes in the center of the negative electrode is larger than a diameter of holes at the periphery of the negative electrode.

8. A method for producing an electric double-layer capacitor, the method comprising:
   forming a positive electrode including a positive electrode layer on one surface of a first positive electrode current collector;
   forming a negative electrode including a negative electrode layer on one surface of a negative electrode current collector;
   forming a first separator between the positive electrode layer and the negative electrode layer;
   forming a second separator between a second positive electrode current collector and the negative electrode current collector; and
   forming a lithium ion doped layer between the second separator and one of the negative electrode current collector and the second positive electrode current collector, wherein
   forming the negative electrode includes forming the negative electrode layer on the one surface of the negative electrode current collector and punching the negative electrode from a side of the negative electrode current collector to form holes penetrating through the negative electrode current collector and reaching the negative electrode layer,
   an electrode layer is not formed between the second positive electrode current collector and the negative electrode current collector,
   the positive electrode, the negative electrode, the first separator, the second separator, and the lithium ion doped layer comprise a basic configuration unit, and
   the electric double-layer capacitor comprises plural basic configuration units.

9. The method for producing an electric double-layer capacitor according to claim 8, wherein the punching comprises sandwiching the negative electrode between a projection roll and a smooth roll, and roll-pressing the negative electrode.

10. The method for producing an electric double-layer capacitor according to claim 9, wherein a height of projections of the projection roll is less than the thickness of the negative electrode.

* * * * *